United States Patent
Xiao et al.

(10) Patent No.: US 11,086,702 B1
(45) Date of Patent: Aug. 10, 2021

(54) API INVOKE REQUEST MANAGEMENT

(71) Applicant: International Business Machines Corporation, Armonk, NY (US)

(72) Inventors: Ping Xiao, Changping (CN); Xin Zhou, Beijing (CN); Yan Feng, Beijing (CN); Yang Zhang, Beijing (CN); Zhen Zhang, Beijing (CN); Wu Song Fang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/999,108

(22) Filed: Aug. 21, 2020

(51) Int. Cl.
  *G06F 9/54* (2006.01)
  *H04L 29/08* (2006.01)

(52) U.S. Cl.
  CPC .............. *G06F 9/547* (2013.01); *H04L 67/32* (2013.01)

(58) Field of Classification Search
  None
  See application file for complete search history.

(56) References Cited

U.S. PATENT DOCUMENTS

| | | | |
|---|---|---|---|
| 5,021,949 A | 6/1991 | Morten | |
| 7,173,929 B1 | 2/2007 | Testardi | |
| 9,646,092 B2 | 5/2017 | Cooper | |
| 2015/0222504 A1 | 8/2015 | Srivastava | |
| 2016/0077901 A1 | 3/2016 | Martori | |
| 2016/0205071 A1 | 7/2016 | Cooper | |
| 2017/0026488 A1* | 1/2017 | Hao | H04L 67/28 |
| 2017/0075909 A1* | 3/2017 | Goodson | G06F 16/122 |
| 2017/0149784 A1 | 5/2017 | White, Jr. | |
| 2018/0137830 A1* | 5/2018 | Lee | G09G 3/3614 |
| 2018/0293533 A1 | 10/2018 | Lowry | |
| 2019/0140895 A1 | 5/2019 | Ennis, Jr. | |
| 2019/0179684 A1* | 6/2019 | On | G06F 9/546 |
| 2019/0386831 A1* | 12/2019 | Jamkhedkar | H04L 9/3213 |
| 2020/0348986 A1* | 11/2020 | Venkatesh | G06F 9/541 |

FOREIGN PATENT DOCUMENTS

WO 2015041706 A1 3/2015

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

*Primary Examiner* — Charles E Anya
(74) *Attorney, Agent, or Firm* — Brian M. Restauro

(57) ABSTRACT

Embodiments of the present invention provide methods, computer program products, and systems. Embodiments of the present invention can receive an application processing interface (API) invoke request for a service to be directed to an API management device. Embodiments of the present invention can then determine that there is a fast path to a service provider for the service requested by the API invoke request according to a fast path record in an accelerator. Embodiments of the present invention can then send the API invoke request to the service provider through the fast path based on the service provider's connection information.

15 Claims, 6 Drawing Sheets

US 11,086,702 B1

API INVOKE REQUEST MANAGEMENT

BACKGROUND

The present invention relates to the field of application programming interface (API), and more specifically, to a method, system and computer program products for processing API invoke requests.

API management is the process of creating and publishing web application programming interfaces (APIs), enforcing their usage policies, controlling access, nurturing the subscriber community, collecting and analyzing usage statistics, and reporting on performance. API management platforms provide mechanisms and tools to support developer and subscriber community. As enterprise core systems are efficient product transaction processing engines and are very expensive to maintain, it's desirable to maximize the performance and provide good customer experience through fast response times for API management.

SUMMARY

According to one embodiment of the present invention, there is provided a computer-implemented method. The method includes: receiving, by one or more processors, an application processing interface (API) invoke request for a service to be directed to an API management device; determining, by one or more processors, that there is a fast path to a service provider for the service requested by the API invoke request according to a fast path record in an accelerator, wherein the fast path record includes the service's identification information and the corresponding service provider's connection information, and the fast path bypasses the API management device; and sending, by one or more processors, the API invoke request to the service provider through the fast path.

Other embodiments and aspects, including but not limited to, computer systems and computer program products, are described in detail herein and are considered a part of the claimed invention.

These and other features and advantages of the present invention will be described, or will become apparent to those of ordinary skill in the art in view of, the following detailed description of the example embodiments of the present invention.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
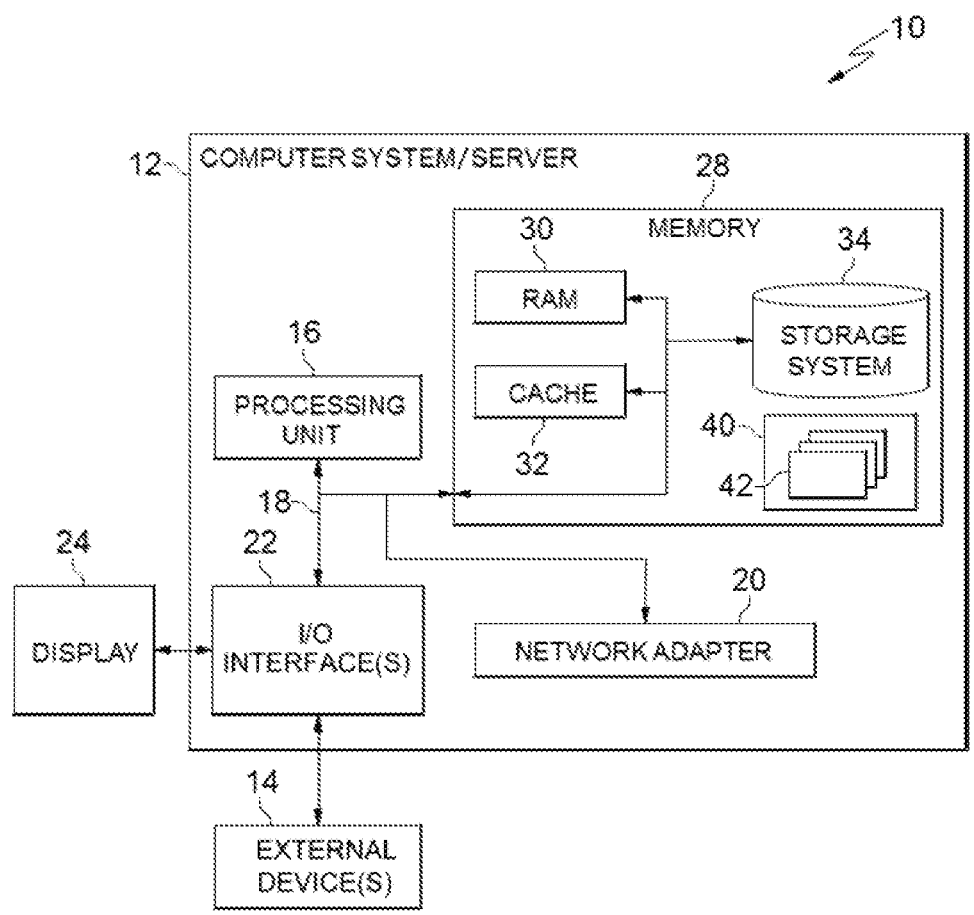
FIG. 1 depicts a cloud computing node according, to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
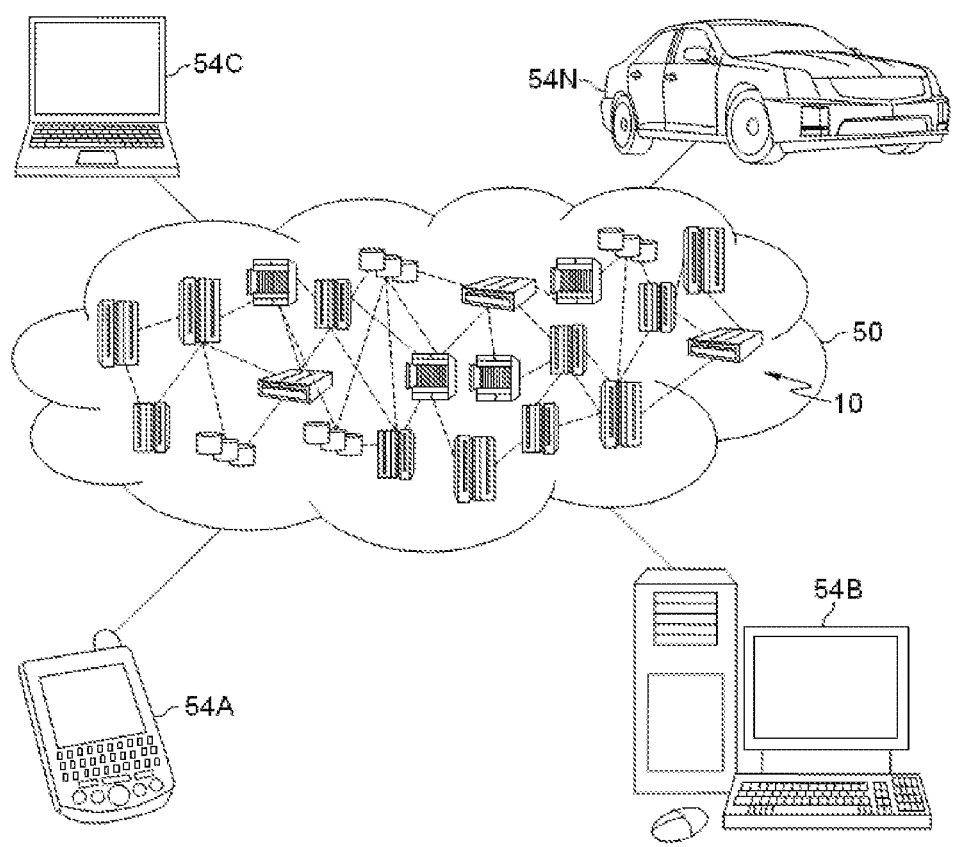
FIG. 2 depicts a cloud computing environment, according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
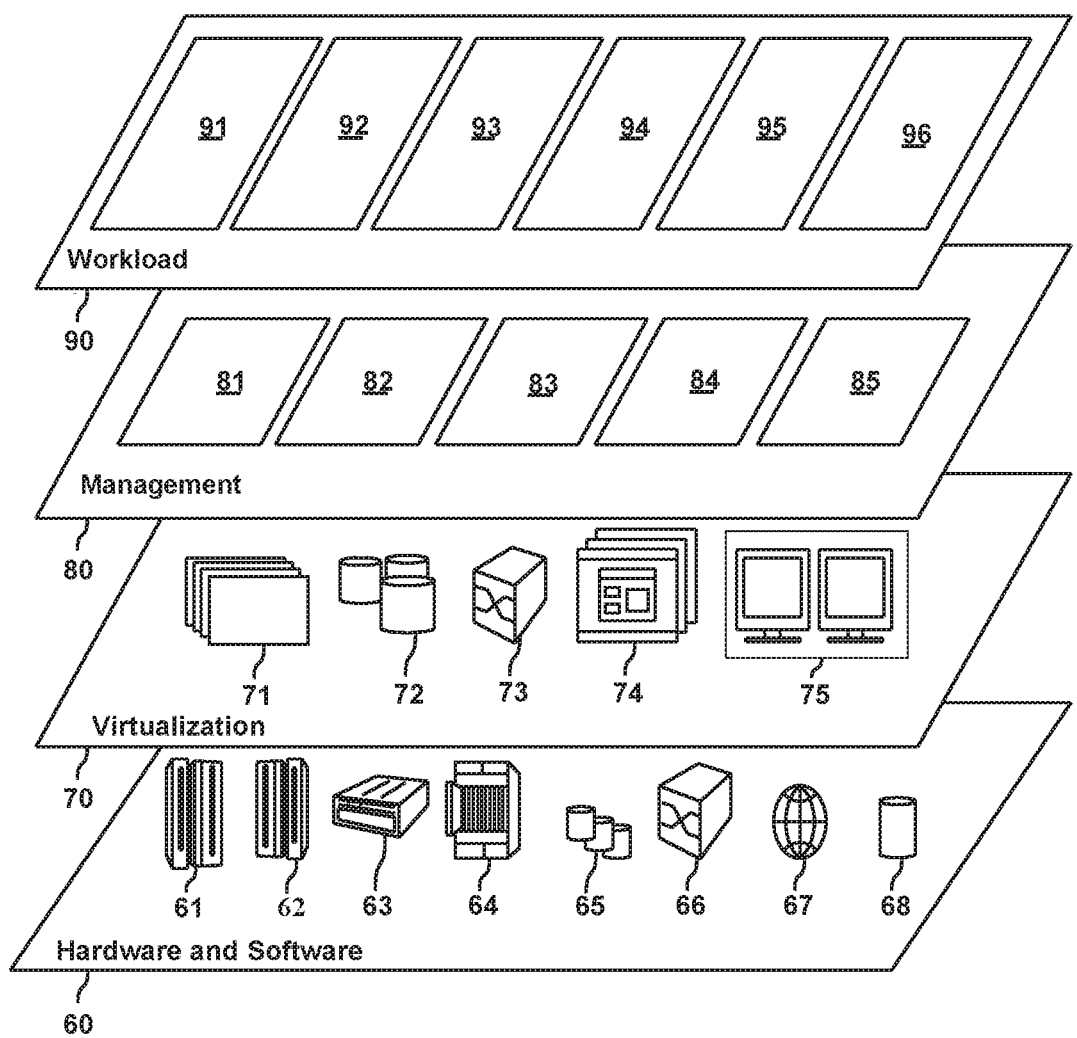
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and API invoke request managing 96. Hereinafter, reference will be made to FIGS. 4-6 to describe details of the API invoke request managing 96.

API management platform may provide a comprehensive set of capabilities to cover the entire lifecycle of an API, from its creation to deployment and management. An API management platform normally includes several set of capabilities: Create, which includes the development lifecycle, design, model, test, build, and deploy; Run, which includes the performance, scalability, load, and resilience of the API runtime platform; Manage, which includes the publishing, socializing, management, governance, and cataloging of APIs and the user management of API consumers and providers, this also covers the monitoring, collection, and analysis of API metrics; Secure, which includes the runtime security enforcement of APIs in terms of authentication, authorization, rate limits, encryption, and proxying of APIs.

Examples of API service consumers may include external application developers, partner application developers, internal application developers for mobile & web apps, business partner apps, enterprise internal apps, Internet of Things, etc. Examples of API service providers may include data stores, cloud services, application servers, ESB/Middleware, z Systems™/Legacy apps, etc.

Figure 4:
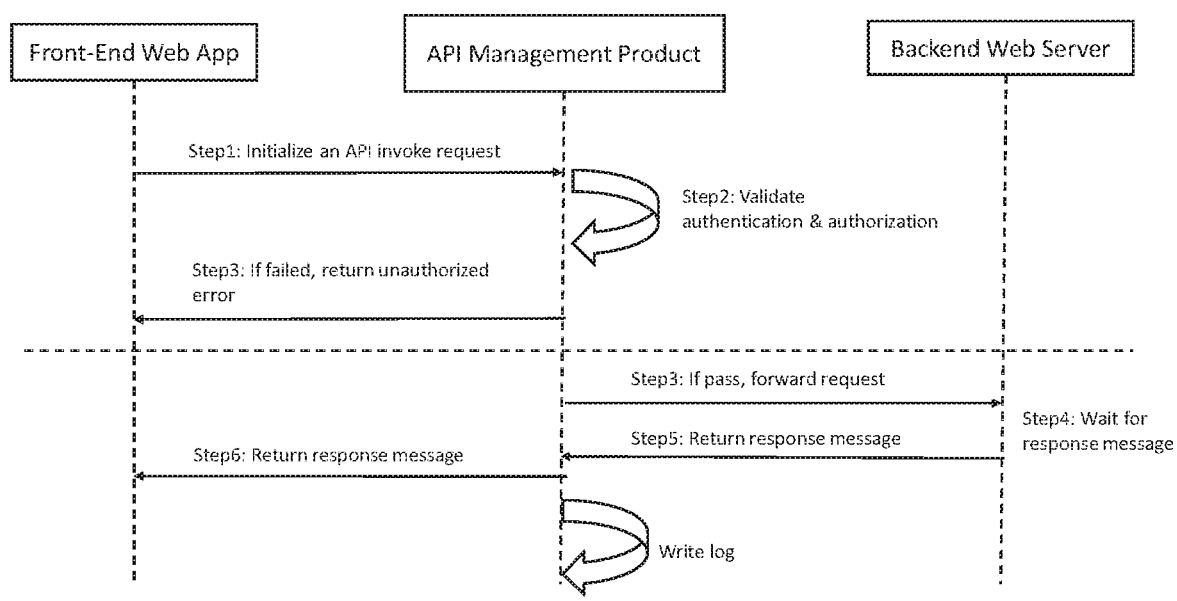
FIG. 4 depicts a normal process flow in a typical API management platform.

FIG. 4 depicts a normal process flow in a typical API management platform. As shown in FIG. 4, a front-end web application initiates an API invoke request to the API management product in Step 1. The API management product validates the authentication and authorization in Step 2. If the authentication and authorization are passed, the API management product identifies a back-end web server for the requested API service, transfers the API invoke request to the back-end web server in Step 3, and then passively waits for response message from the back-end web server in Step 4. The back-end web server returns the response message to the API management product in Step 5, and the API management product returns the response message to the front-end web application in Step 6. If the authentication and authorization fail, the API management product returns unauthorized error to the front-end web application in Step 3. The API management device then writes log to file for track and audit.

With the above process, even when the front-end web application and the back-end web server are in a same system with a trust relationship, the API invoke request still needs to go through a long path and complicated authentication and authorization process to invoke API from API management product which locates outside of the system. In this embodiment, the same system may refer to a same physical machine, a same cluster of machines, a same private cloud, or any suitable environment where the front-end web application and the back-end web server may locate.

In order to at least partially solve the above and other potential problems, embodiments of the present disclosure provide a solution for improving API management performance. According to embodiments of the present invention, an accelerator may be provided to record a fast path from the front-end web application to the back-end web server for an API invoke request. When an API invoke request for a service is received from the application, a proxy for the application checks the accelerator's record to see if there is a fast path to a service provider for the requested service. If yes, the API invoke request would be sent to the service provider through the fast path and the response from the service provider would be returned through the fast path. Through this fast path, the interaction with the API management product would be bypassed. The fast path recorded in the accelerator may be created by the API management product and provided to the accelerator when the API invoke request is processed by the API management product first time.

In this embodiment, the term "accelerator" used herein is just for descriptive purpose and is not intended to suggest any limitation as to the scope of use or functionality of embodiments of the invention described herein. An accelerator may refer to any suitable device or program modules which may implement the functionality of embodiments of the invention described herein. Also, in the context of the present disclosure, the terms "front-end web application", "application server", "API service consumer", "service consumer" may refer to a same entity which would request an API service. The terms "back-end web server", "API service provider", "service provider" may refer to a same entity which would provide an API service.

Figure 5:
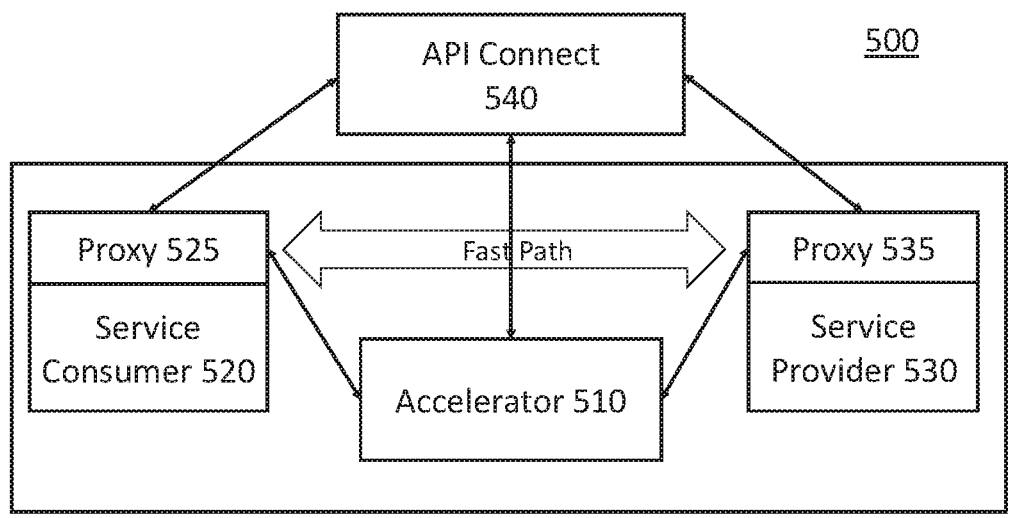
FIG. 5 is a diagram illustrating an example environment in which systems and/or methods according to embodiments of the present invention may be implemented.

FIG. 5 is a diagram illustrating an example environment 500 in which systems and/or methods described herein according to embodiments of the present invention may be implemented. It is to be understood that the structure and functionality of the environment 500 are described only for the purpose of illustration without suggesting any limitations as to the scope of the present disclosure.

As shown in FIG. 5, the environment 500 may include an accelerator 510, service consumer 520, service provider 530, and API connect 540. The service consumer 520 may be a front-end web application which would like to invoke an API service. The service provider 530 may be back-end web server which can provide API service according to an API invoke request. The API connect 540 may be an API management device or a module or component in the API management product as described with reference to FIG. 4, which may receive an API invoke request from the service consumer 520, identify a service provider 530 for the request, forward the request to the service provider 530, receive response from the service provider 530, and return the response to the service consumer 520. According to an embodiment of the present invention, a proxy 525 may be provided for the service consumer 520 to communicate with the accelerator 510 an the API connect 540, and a proxy 535 may be provided for the service provider 530 to communicate with the accelerator 510 an the API connect 540. Please note that the proxy 525 and the proxy 535 may be omitted from the environment 500 in which systems and/or methods described herein according to embodiments of the present invention may be implemented.

The service consumer 520 and the service provider 530 may be in a same system with a trust relationship. Please be noted that in the context of the present disclosure, the same system may refer to a same physical machine, a same cluster of machines, a same private cloud, or any suitable environment where the service consumer 520 and the service provider 530 may locate.

According to embodiments of the present invention, the accelerator 510 is provided to record a fast path from the service consumer 520 to the service provider 530 for an API invoke request. The accelerator 510 may be defined in the same system with the service consumer 520. The accelerator 510 may collect service consumer and service provider's connection information and register the connection information with the API connect 540. The connection information may be used to establish a fast path between the service consumer and the service provider. For example, the connection information may include the service provider 530's IP address. The accelerator 510 may collect the IP addresses from host information and virtual IP configuration table and register those IP addresses with the API connect 540.

For example, the registration information of the accelerator 510 to the API connect may be in a form of "Accelerator 1: IP1, IP2: IP3", in which "Accelerator 1" is the ID of the accelerator 510, "IP1" is the service consumer 510's IP address, "IP2" and "IP3" are respective IP addresses of two service providers 530. With the accelerator's registration information, the API connect 540 may invoke corresponding accelerator and send the fast path information to the accelerator when it receives an API invoke request from a service consumer 520 and identifies corresponding service provider 530 with corresponding IP address.

The accelerator 510 may store the received fast path information in a fast path record, which may include the service's identification information and the corresponding service provider's connection information, such as IP address. For example, according to an embodiment of the present invention, the fast path record may be table in a form as below, in which "IP" refers to the service consumer's IP address, "Service 1" refers to the service's identification, and "IP2" refers to the service provider's IP address as denoted in Table 1 below:

TABLE 1

| Fast Path Record | |
| --- | --- |
| IP1 | Service 1: IP2 |

According to embodiments of the present invention, the fast path is a path between the service consumer 420 and the service provider 430 which would bypass the API connect. So next time when there is an API invoke request for the same service, the API invoke request may be communicated between the service consumer 420 and the service provider 430 directly. This will reduce the long waiting time and complicated authentication and authorization process in the normal API request management process.

According to embodiments of the present invention, the accelerator's registration with the API connect 540 may be performed by the API connect 540 automatically. For example, the API connect 540 checks with the accelerator 510 regularly to retrieve its interested IP addresses. Thus, the fast path between the service consumer 520 and the service provider 530 may be established and adjusted dynamically. The accelerator's registration with the API connect 540 may also be performed manually.

Figure 6:
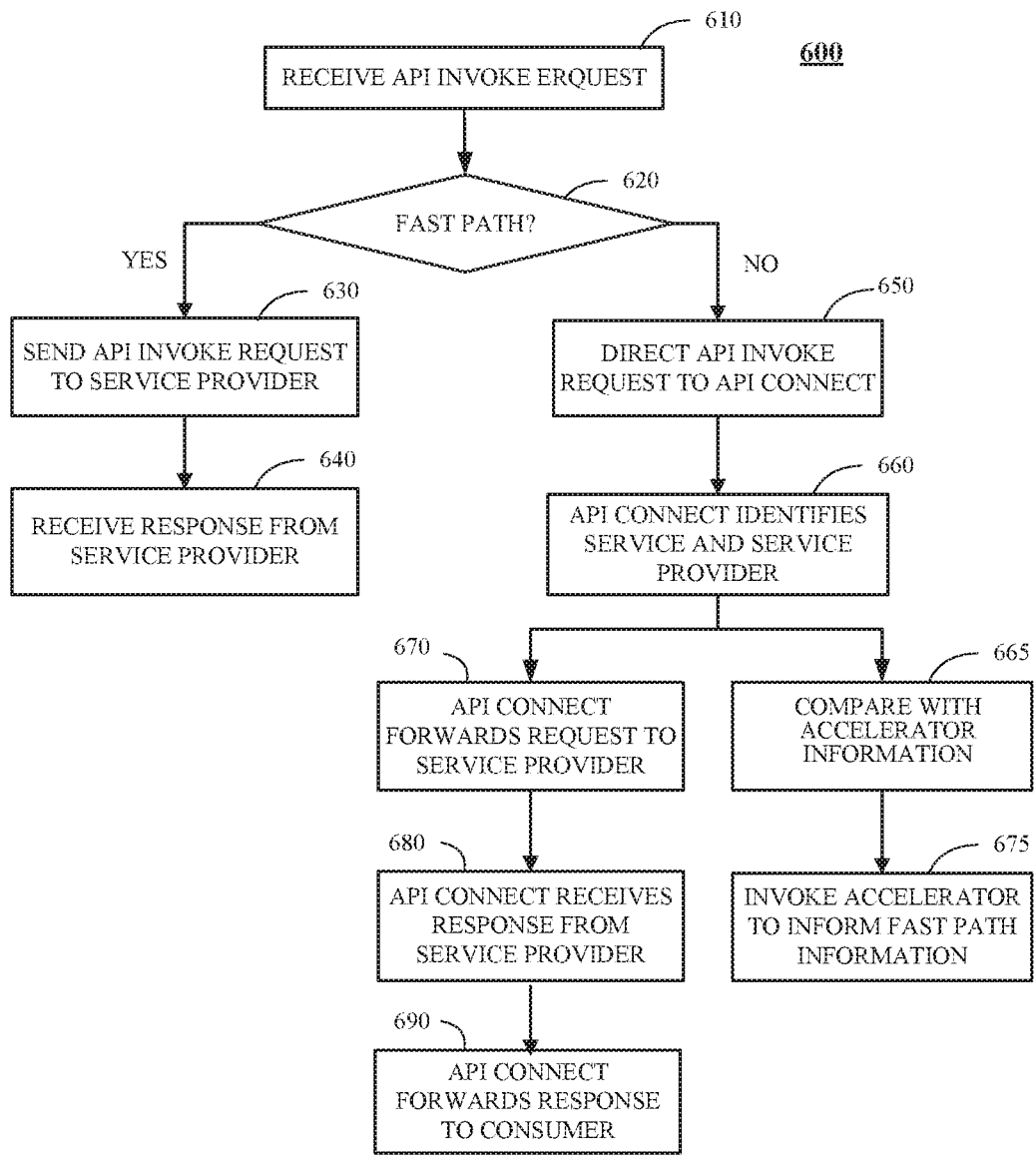
FIG. 6 depicts a flowchart of an example method 600 for processing API invoke request according to embodiments of the present invention.

FIG. 6 depicts a flowchart of an example method 600 for processing API invoke request according to embodiments of the present invention. For example, the method 600 may be implemented by the computer system/server 12 of FIG. 1. It is to be understood that the method 600 may also comprise additional blocks (not shown) and/or may omit the illustrated blocks. The scope of the present disclosure described herein is not limited in this aspect.

At block 610, a proxy 525 for a service consumer 520 receives an API invoke request for a service. The API invoke request is to be directed to an API connect 540.

At block 620, the proxy 525 determines whether there is a fast path to a service provider for the service requested by the API invoke request according to a fast path record. The fast path may be recorded and/or stored in an accelerator 510. According to an embodiment of the present invention, the fast path bypasses the API connect 540. The fast path recorded in the accelerator 510 may include the service's identification information and the corresponding service provider's connection information, such as the service provider's IP address.

In some embodiments of the present invention, the proxy 525 may call the accelerator 510 to check whether there is a fast path to a service provider 530 for the requested service. For example, the proxy 525 for the service consumer may send the service's identification information to the accelerator 510 and the accelerator 510 check its fast path record(s) to determine if there is any record corresponding to the service's identification information. If the accelerator 510 finds that there is a fast path for the service, the accelerator 510 would provide the corresponding service provider's connection information to the proxy 525 for the service consumer.

If the proxy 525 determined at block 620 that there is a fast path to the service provider, process goes to block 630, where the proxy 525 for the service consumer sends the API invoke request to the service provider 530 through the fast path by using the service provider's connection information obtained from the accelerator 510. And then, at block 640, the proxy 525 receives a response of the API invoke request from the service provider 539 through the fast path.

If the proxy 525 determined at block 620 that there is no fast path for the service, process goes to block 650, where the API invoke request is sent to the API connect 540. The API connect 540 identifies the service information from the API invoke request and a service provider 530 for the requested service at block 660, sends the API invoke request to the service provider 530 at block 670, and receives a response for the API invoke request from the service provider 530 at block 680. The API connect 540 then returns the received response to the proxy 525 for the service consumer at block 690.

As described above, according to an embodiment of the present invention, the fast path record in the accelerator 510 may be obtained from the API connect 540. According to an embodiment of the present invention, the accelerator 510 may be registered with the API connect 540 with registration information in advance. The accelerator's registration information may also be obtained by the API connect 540 automatically. And the registration information may include IP addresses of the service consumer and the service provider that the accelerator may support. For example, the IP address may include the IP address of a service provider which may locate in a same system with the application server for the application.

According to an embodiment of the present invention, the API connect 540 may send the fast path record to the accelerator 510 in response that the API invoke request and the service provider's IP address correspond to the accelerator's registration information. After the API connect 540 identifies the service information and a service provider for the requested service at block 660, at block 665, the API connect 540 compares the service provider's connection information with the accelerator 510's registration information. If there is a match, at block 675, the API connect 540 invokes the corresponding accelerator to inform the accelerator 510 the corresponding fast path information, which includes the service information and the service provider 530's connection information. The accelerator 510 may save the information in a fast path record. According to an embodiment of the present invention, an example fast path record may include the service consumer's ID, the service ID and the service provider's connection information.

Through above described process, during the first call for the API service by the service consumer, the accelerator 510 would be invoked by the API connect 540 to record a fast path between the service consumer 520 and the service provider 530. In the next calls for the API service by the service consumer, the proxy 525 for the service consumer may call the local accelerator 510 to check if a fast path exists. If a fast path exists, the accelerator may provide the corresponding service provider's connection information to the proxy 525. The proxy 525 would block the normal API invoke request to the API connect 540 and redirect the API invoke request to the service provider directly. And the response for the API invoke request may be received from the service provider directly. Therefore, there is no need to take a long path through the API connect 540 for the request, which may reduce the waiting time. Also, since both the service consumer and the service provider may locate in a same system with trusted relationship, the effort to do complicated authentication and authorization may be reduced.

In some embodiments of the present invention, for audit purpose, the accelerator 510 may construct request notification data and send the request notification data to API connect 540. The notification request may be sent to API connect 540 asynchronously, that is, through a separate thread with the thread for processing the API invoke request. The request notification data may include information such as request time, request IP, service path, service ID, user ID, session ID, etc.

In some embodiments of the present invention, upon receiving the request from the service consumer 520, the service provider 530 may return the response for the request to the service consumer 520 through a proxy 535. The proxy 535 for the service provider 530 may also construct a response notification data and send the response notification data to the API connect 540 asynchronously, through a separate thread with the thread for processing the API invoke request. The response notification data may include information such as response time, response IP, response status, session ID, etc.

Although the above process is described by using front-end web application as an example of service consumer, according to an embodiment of the present invention, the method may also be used for reducing the path of internal system call between two API servers. Under such situation, the service consumer may be another API server. The proxy 535 for the service provider 530 may provide its internal call method to the accelerator 510. The internal call method may include connection method such as common area/channel container name/message queue, etc. and direct call dependencies such as lib package, APPLID/netname etc. With the internal call method related information recorded in the accelerator 510, there is no need to go through the API connect 540 for internal system call between the service consumer 520 and the service provider 530. Thus, there is no need to perform data conversion, request construction and HPPT routing which would be required in a normal system call process between two API servers.

According to an embodiment of the present invention, the proxy 525 for the service consumer and the proxy 535 for the service provider may be implemented by a piece of program called STUB. A STUB under the context of network is a somewhat casual term describing a computer network, or part of an internetwork, with no knowledge of other networks, that will typically send much or all of its non-local traffic out via a single path, with the network aware only of a default route to non-local destinations. Please be noted that although the proxy 525 for the service consumer and the proxy 535 for the service provider are described separately from the service consumer and the service provider to implement the functionality according to embodiments of the present invention, their functionality may be implemented within the service consumer and the service provider respectively. Thus, the proxy 525 and 535 may be omitted from the system without departing from the scope and spirit of the described embodiments.

Although embodiments of the present invention are described above involve API invoke request from a "service consumer" to a "service provider", it would be understood that the roles of "service consumer" and "service provider" may be interchangeable. For example, the service provider 530 may initiate a request to the service consumer through a fast path as established with the method according to embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving, by one or more processors, an application processing interface (API) invoke request for a service to be directed to an API management device;
determining, by one or more processors, that there is a fast path to a service provider for the service requested by the API invoke request according to a fast path record, wherein the fast path record includes the service's identification information and corresponding service provider's connection information, and the fast path bypasses the API management device;
sending, by one or more processors, the API invoke request to the service provider through the fast path based on the service provider's connection information;
determining, by one or more processors, that there is no fast path to a service provider for the service requested by the API invoke request according to a fast path record; and
in response to determining that there is no fast path to a service provider for the service requested by the API invoke request, directing, by one or more processors, the API invoke request to the API management device, wherein in response to receiving the API invoke request for the service, the API management device identifies a service provider for the service requested by the API invoke request, and wherein, in response to the API invoke request and the service provider's information correspond to an accelerator's registration information in the API management device, the API management device sends a fast path record to the accelerator.

2. The computer-implemented method of claim 1, further comprising:
receiving, by one or more processors, a response for the API invoke request from the service provider through the fast path.

3. The computer-implemented method of claim 1, wherein the fast path record is stored in an accelerator, and wherein determining that there is a fast path to a service provider for the service requested by the API invoke request according to a fast path record includes:
calling, by one or more processors, the accelerator to check whether there is a fast path to a service provider for the service requested by the API invoke request; and
obtaining, by one or more processors, the service provider's connection information in response that there is a fast path to the service provider for the service according to the fast path record in the accelerator.

4. The computer-implemented method of claim 3, wherein the fast path record is obtained from the API management device during the API management device processes a first API invoke request for the service.

5. The computer-implemented method of claim 1, wherein the accelerator is registered with the API management device with registration information including the service consumer's information and the service provider's information.

6. The computer-implemented method of claim 1, wherein the accelerator sends request notification data regarding the API invoke request to the API management device.

7. The computer-implemented method of claim 1, wherein the service provider sends response notification data regarding the response to the API management device.

8. A computer system comprising:
one or more computer processors;
one or more computer readable storage media; and
program instructions stored on the one or more computer readable storage media for execution by at least one of the one or more computer processors, the program instructions comprising:
program instructions to receive an application processing interface (API) invoke request for a service to be directed to an API management device;
program instructions to determine that there is a fast path to a service provider for the service requested by the API invoke request according to a fast path record in an accelerator, wherein the fast path record includes the service's identification information and corresponding service provider's connection information, and the fast path bypasses the API management device;
program instructions to send the API invoke request to the service provider through the fast path based on the service provider's connection information, program instructions to determine that there is no fast path to a service provider for the service requested by the API invoke request according to a fast path record; and program instructions to, in response to determining that there is no fast path to a service provider for the service requested by the API invoke request, direct the API invoke request to the API management device, wherein in response to receiving the API invoke request for the service, program instructions to identify, by the API management device a service provider for the service requested by the API invoke request, and wherein, in response to the API invoke request and the service provider's information correspond to an accelerator's registration information in the API management device, program instructions to send, by the API management device a fast path record to the accelerator.

9. The computer system of claim 8, wherein the program instructions stored on the one or more computer readable storage media further comprise:

program instructions to receive a response for the API invoke request from the service provider through the fast path.

10. The computer system of claim 8, wherein the fast path record is stored in an accelerator, and wherein the program instructions to determine that there is a fast path to a service provider for the service requested by the API invoke request according to a fast path record comprise:

program instructions to call the accelerator to check whether there is a fast path to a service provider for the service requested by the API invoke request; and program instructions to obtain the service provider's connection information in response that the accelerator determines that there is a fast path to the service provider for the service according to the fast path record in the accelerator.

11. The computer system of claim 10, wherein the fast path record in the accelerator is obtained from the API management device during the API management device processes a first API invoke request for the service.

12. The computer system of claim 8, wherein the program instructions stored on the one or more computer readable storage media further comprise:

program instructions to determine that there is no fast path to a service provider for the service requested by the API invoke request according to a fast path record; and program instructions to, in response to determining that there is no fast path to a service provider for the service requested by the API invoke request, direct the API invoke request to the API management device.

13. A computer program product comprising:

one or more computer readable storage media and program instructions stored on the one or more computer readable storage media, the program instructions comprising:

program instructions to receive an application processing interface (API) invoke request for a service to be directed to an API management device;

program instructions to determine that there is a fast path to a service provider for the service requested by the API invoke request according to a fast path record in an accelerator, wherein the fast path record includes the service's identification information and corresponding service provider's connection information, and the fast path bypasses the API management device;

program instructions to send the API invoke request to the service provider through the fast path based on the service provider's connection information, program instructions to determine that there is no fast path to a service provider for the service requested by the API invoke request according to a fast path record; and program instructions to, in response to determining that there is no fast path to a service provider for the service requested by the API invoke request, direct the API invoke request to the API management device, wherein in response to receiving the API invoke request for the service, program instructions to identify, by the API management device a service provider for the service requested by the API invoke request, and wherein, in response to the API invoke request and the service provider's information correspond to an accelerator's registration information in the API management device, program instructions to send, by the API management device a fast path record to the accelerator.

14. The computer program product of claim 13, wherein the program instructions stored on the one or more computer readable storage media further comprise:

program instructions to receive a response for the API invoke request from the service provider through the fast path.

15. The computer program product of claim 13, wherein the fast path record is stored in an accelerator, and wherein the program instructions to determine that there is a fast path to a service provider for the service requested by the API invoke request according to a fast path record comprise:

program instructions to call the accelerator to check whether there is a fast path to a service provider for the service requested by the API invoke request; and program instructions to obtain the service provider's connection information in response that the accelerator determines that there is a fast path to the service provider for the service according to the fast path record in the accelerator.

* * * * *